United States Patent [19]
Sasaki et al.

[11] Patent Number: 5,193,655
[45] Date of Patent: Mar. 16, 1993

[54] VARIABLE DAMPING FORCE SHOCK ABSORBER WITH FEATURE OF LINEAR AND WIDE RANGE DAMPING FORCE VARIATION DEPENDING UPON PISTON STROKE SPEED

[75] Inventors: Mitsuo Sasaki; Shinobu Kakizaki; Fumiyuki Yamaoka; Hiroyuki Shimizu, all of Kanagawa, Japan

[73] Assignee: Atsugia Unisia Corp., Japan

[21] Appl. No.: 911,376

[22] Filed: Jul. 13, 1992

Related U.S. Application Data

[63] Continuation of Ser. No. 583,829, Sep. 13, 1990, abandoned.

[30] Foreign Application Priority Data

Sep. 20, 1989 [JP] Japan .............................. 1-109919[U]

[51] Int. Cl.⁵ .............................................. F16F 9/46
[52] U.S. Cl. .................................. 188/299; 188/322.15
[58] Field of Search ........... 188/280, 299, 319, 322.15; 280/714

[56] References Cited

U.S. PATENT DOCUMENTS

| 4,615,420 | 10/1986 | Mourray | 188/280 |
| 4,627,637 | 12/1986 | Toshimitsu et al. | 280/714 |
| 4,696,379 | 9/1987 | Yamamoto et al. | 188/319 |
| 4,754,855 | 7/1988 | Kuwana et al. | 188/299 |
| 4,826,207 | 5/1989 | Yoshioka et al. | 280/714 |
| 4,905,799 | 3/1990 | Yamaoka et al. | 188/280 |
| 4,953,671 | 9/1990 | Imaizumi | 188/299 |
| 4,964,493 | 10/1990 | Yamaura et al. | 188/280 |
| 5,133,434 | 7/1992 | Kikushima et al. | 188/299 |

FOREIGN PATENT DOCUMENTS

| 0196030 | 10/1986 | European Pat. Off. . | |
| 3613386 | 10/1986 | Fed. Rep. of Germany . | |
| 3542846 | 6/1987 | Fed. Rep. of Germany . | |
| 3832625 | 4/1989 | Fed. Rep. of Germany . | |
| 4021909 | 2/1991 | Fed. Rep. of Germany . | |
| 0194609 | 11/1983 | Japan | 188/322.15 |
| 61-65930 | 4/1986 | Japan . | |
| 0014935 | 1/1991 | Japan | 188/299 |
| 0051549 | 3/1991 | Japan | 188/299 |
| 0140644 | 6/1991 | Japan | 188/299 |
| 2111168 | 6/1983 | United Kingdom . | |
| 2120355 | 11/1983 | United Kingdom . | |
| 2123922 | 2/1984 | United Kingdom . | |
| 2126687 | 3/1984 | United Kingdom . | |
| 2146734 | 4/1985 | United Kingdom . | |
| 2180320 | 3/1987 | United Kingdom . | |
| 2220726 | 1/1990 | United Kingdom . | |

Primary Examiner—Robert J. Oberleitner
Assistant Examiner—Chris Schwartz
Attorney, Agent, or Firm—Ronald P. Kananen

[57] ABSTRACT

A variable damping force shock absorber includes a cylinder defining therein first and second fluid chambers separated by a valve body. The valve body defines first and second fluid paths for fluid communication between the first and second fluid chambers. A harder damping characteristics valve is associated with the first fluid path. On the other hand, a softer damping characteristics valve is associated with the second fluid path. The valve body has a pair of coaxial arranged grooves. The inner groove is in communication with the first fluid path. Valve seats are formed along respective outer circumference of the inner and outer grooves. The second fluid path is provided with means for varying the fluid path area.

2 Claims, 3 Drawing Sheets

VARIABLE DAMPING FORCE SHOCK ABSORBER WITH FEATURE OF LINEAR AND WIDE RANGE DAMPING FORCE VARIATION DEPENDING UPON PISTON STROKE SPEED

This application is a continuation of application Ser. No. 07/583,829 filed Sep. 13, 1990, now abandoned.

BACKGROUND OF THE INVENTION

1. Field of the Invention

The present invention relates generally to variable damping force shock absorber for an automotive suspension system. More specifically, the invention relates to a variable damping force shock absorber which can achieve linear damping force variation characteristics depending upon piston stroke speed with satisfactorily wide range of damping force variation.

2. Description of the Background Art

Japanese Patent First (unexamined) Publication (Tokkai) Showa 61-65930 discloses a variable damping force shock absorber for an automotive suspension system. The shown variable damping force shock absorber has a piston which has one axial end surface facing one of two fluid chambers. Three co-axial grooves are formed on the axial end surface. The grooves are closed by disc valve sealingly contacting with the outer surrounding edge of thereof. The disc valve is resiliently openable for establishing fluid communication between one of the fluid chambers and the other fluid chamber through respectively associated fluid communication paths for generating damping force. The disc valve is operable in a variable damping mode, in which when fluid communication is established only through the innermost groove and associated fluid flow paths, the shock absorber operates in HARD mode. On the other hand, when the fluid communication is established through the intermediate groove and the associated fluid paths, the shock absorber operates in MEDIUM mode. When the fluid communication is established through all grooves and all fluid paths, the mode of the shock absorber becomes SOFT.

In such conventional variable damping force shock absorbers, linear damping force variation characteristics can be achieved by multistage valve seats. However, on the other hand, since such conventional shock absorbers employ a sole disc valve, sufficiently high rigidity is required to obtain high damping force in the HARD mode. Such high rigidity of the disk valve may narrow damping force variation range in the SOFT mode. Therefore, setting of the valve disc stiffness becomes difficult.

SUMMARY OF THE INVENTION

Therefore, it is an object of the present invention to provide a variable damping force shock absorber which can achieve both linear damping force variation characteristics and wide variation range.

In order to accomplish the aforementioned object, a variable damping force shock absorber, according to the present invention, includes a cylinder defining therein first and second fluid chambers separated by a valve body. The valve body defines first and second fluid paths for fluid communication between the first and second fluid chambers. A harder damping characteristics valve is associated with the first fluid path. On the other hand, a softer damping characteristics valve is associated with the second fluid path. The valve body has a pair of coaxially arranged grooves. The inner groove is in communication with the first fluid path. Valve seats are formed along respective outer circumferences of the inner and outer grooves. The second fluid path is provided with means for varying the fluid path area.

According to one aspect of the invention, a variable damping force shock absorber comprises:

a cylinder defining first and second fluid chambers separated by a piston assembly which is disposed within the interior space of the cylinder for thrusting movement according to relative displacement between a vehicle body and a road wheel;

a first fluid path defined for fluid flow from the first fluid chamber to the second fluid chamber in response to the stroke of the piston assembly compressing the volume of the first fluid chamber;

a second fluid path defined in parallel relationship with the first fluid path for fluid flow from the first fluid chamber to the second fluid chamber in response to stroke of the piston assembly compressing the volume of the first fluid chamber;

a first valve means disposed within the first fluid path for generating relatively high damping force resisting the piston stroke, the damping characteristics of the first valve means being substantially linearly proportional to piston stroke speed;

a second valve means disposed within the second fluid path for generating relatively low damping force against the piston stroke.

In the preferred construction, the first valve means comprises means for forming a first variable path area orifice which varies the fluid path area depending upon piston stroke speed to vary damping force to be generated and a second variable path area orifice arranged in series with the first variable path area orifice and to vary the fluid path area in unison with the first variable path area orifice in order to vary damping force depending upon piston stroke speed. In such case, the first and second variable path area orifices are provided the damping force variation characteristics proportional to the ⅔ power of the piston stroke speed. The second valve means may comprise a constant fluid path area orifice which is externally adjustable to vary the fluid path area.

The variable damping force shock absorber may further comprise a check valve provided in the second fluid path for blocking fluid flow in reverse direction.

The first valve means may comprise a disc valve seating on co-axially arranged annular valve seats, the first variable path area orifice being defined by the disc valve, and one of the annular valve seat and the second variable path area orifice being defined by the disc valve and the other valve seat. The disc valve may be resiliently deformable in response to fluid pressure exerted thereonto and is provided with greater spring force at a portion seated on one of the valve seats than that of a portion seated on the other valve seat.

The second valve means may comprise a rotary valve body defining an axially extending groove serving as part of the second fluid path, the axially extending groove being variable of overlapping magnitude with an associated end of a radial section of the second fluid path, depending upon angular position of the rotary valve body, for varying fluid path area, which then is maintained constant irrespective of piston stroke speed. In such case, the axially extending groove may be disposed between a pair of radial sections of the second fluid path for defining a constant fluid path area orifice each end of the groove.

According to another aspect of the invention, a variable damping force shock absorber comprises:

a cylinder defining first and second fluid chambers separated by a piston assembly which is disposed within the interior space of the cylinder for thrusting movement according to relative displacement between a vehicle body and a road wheel;

a first fluid path defined for fluid flow from the first fluid chamber to the second fluid chamber in response to the stroke of the piston assembly compressing the volume of the first fluid chamber;

a second fluid path defined in parallel relationship with the first fluid path for fluid flow from the first fluid chamber to the second fluid chamber in response to the stroke of the piston assembly compressing the volume of the first fluid chamber;

a third fluid path defined independently of the first and second fluid paths, for fluid flow from the second fluid chamber to the first fluid chamber in response to the stroke of the piston assembly compressing the volume of the second fluid chamber;

a fourth fluid path defined independently of the first and second fluid paths and in parallel relationship with the third fluid path for fluid flow from the second fluid chamber to the first fluid chamber in response to the stroke of the piston assembly compressing the volume of the second fluid chamber;

a first valve means disposed within the first fluid path for generating relatively high damping force resisting the piston stroke, the damping characteristics of which are substantially linearly proportional to piston stroke speed;

a second valve means disposed within the second fluid path for generating relatively low damping force against the piston stroke;

a third valve means disposed within the third fluid path for generating relatively high damping force against piston stroke, the damping characteristics of which are substantially linearly proportional to piston stroke speed; and a fourth valve means disposed within the fourth fluid path for generating relatively low damping force against the piston stroke.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
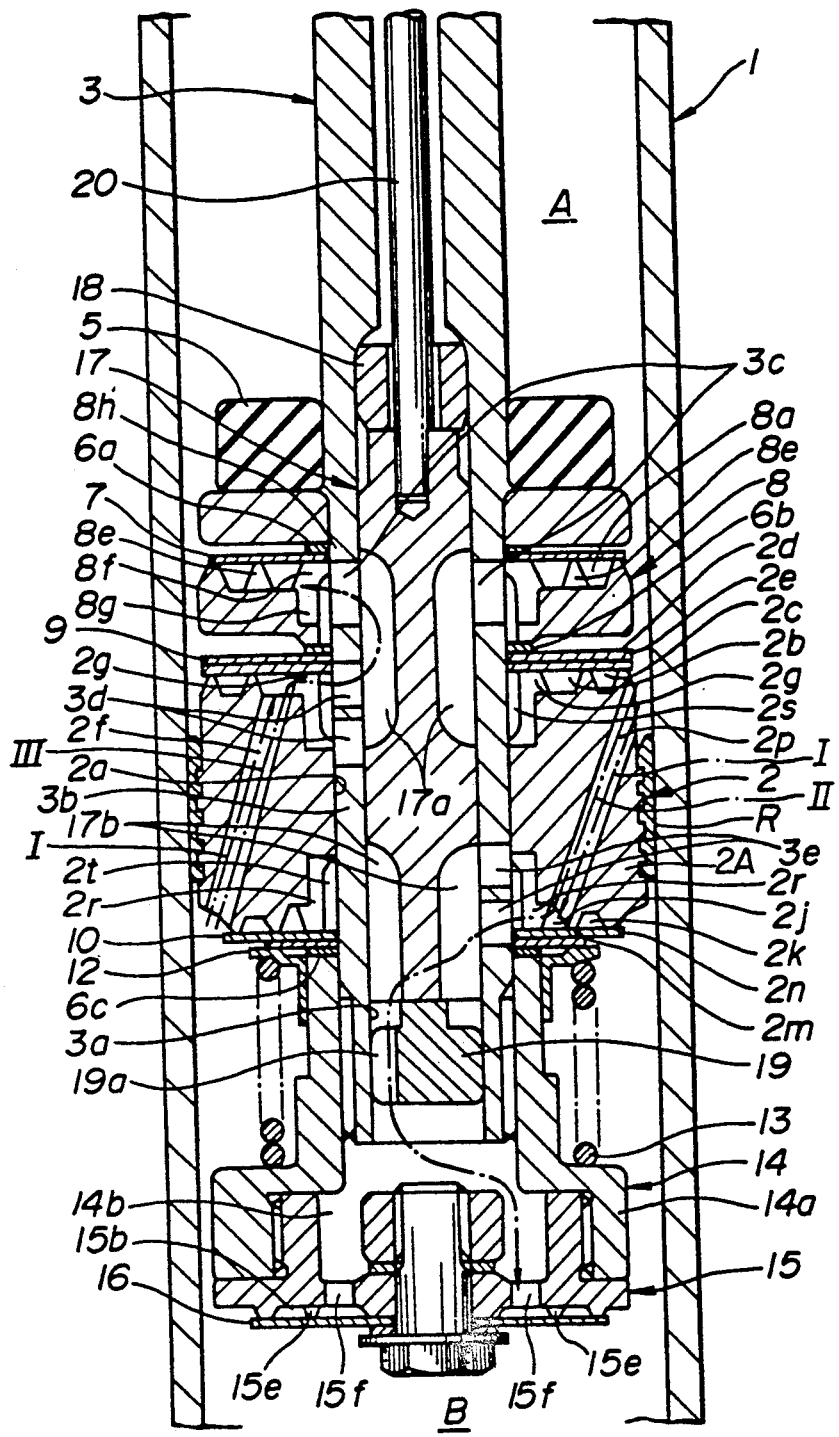
FIG. 1 is a section of the major part of the preferred embodiment of a variable damping force shock absorber, according to the invention.

Referring now to the drawings, particularly to FIG. 1, the preferred embodiment of a variable damping force shock absorber, according to the present invention, includes a cylinder 1 defining therein an interior space. A piston assembly 2 is disposed within the interior space for defining upper and lower fluid chambers A and B. Both of the upper and lower fluid chambers A and B are filled with a working fluid. The piston assembly 2 is mounted in the vicinity of the lower end of a piston rod 3 which extends from the upper end of the cylinder 1 and is connected to a vehicular body at the upper end. The piston rod 3 is of hollow cylindrical construction defining an axially extending bore 3a.

The piston assembly 2 comprises a rebounding stopper 5, a washer 6a, a compression check valve 7, an upper valve body 8, a washer 6b, a compression damping valve 9, a piston body 2A, an expansion damping valve 10, a washer 6c, a spring seat 12, a spring 13 and a fastening nut 14. The components of the piston assembly 2 are assembled on the lower end portion of the piston rod 3 and fixed thereon by means of the fastening nut 14. The upper valve body 8 and the piston body 2A are formed with axial openings 8h and 2a, respectively. A sealing ring R is mounted on the outer periphery of the piston body 2A for establishing a liquid-tight seal with the inner periphery of the cylinder 1.

The upper valve body 8 is formed with an annular groove 8a on the upper surface. An annular projection 8e projects from the bottom of the groove 8a for supporting the compression check valve 7, which is provided with substantially low stiffness. One or more radial grooves 8f are formed through the annular projection 8e for fluid communication between inner and outer sides of the annular projection. An annular groove 8g formed on the inner periphery of the axial opening 8b is in fluid communication with the annular groove 8a. The annular groove 8g is in fluid communication with the axial bore 3a via compression flow ports 3c.

The piston body 24 is also formed with coaxially arranged inner and outer annular grooves 2b and 2c and inner and outer lands having valve seat surfaces 2d and 2e. The inner groove 2b is in fluid communication with the lower fluid chamber B via a plurality of compression fluid paths 2f. The inner groove 2b is also in fluid communication with a central annular groove 2a via a plurality of radial grooves 2g. The central annular groove 2s is in fluid communication with the axial bore 3a of the smaller diameter section 3b of the piston rod 3 via a pair of radial ports 3d which are formed through the peripheral wall of the piston rod in axially off-set position to each other. The upper opening ends of the inner and outer annular grooves 2b and 2c are closed by compression damping valve 9.

Substantially symmetric construction is formed on the lower surface of the piston body 2A in opposition to the lower fluid chamber B. Namely, inner and outer annular grooves 2j and 2k are formed on the lower surface of the piston body 2A. The inner annular groove 2j is in fluid communication with an annular central groove 2t via radial grooves 2r. The central groove 2t is in fluid communication with the axial bore 3a of the piston rod 3 via a pair of radial ports 3e which are formed through the peripheral wall of the piston rod in axially off-set position to each other. Inner and outer lands with valve seat surfaces 2m and 2n are formed along respective of the outer circumferential edges of the inner and outer grooves 2j and 2k. The expansion damping valve 10 normally seats on these inner and outer valve seats. As can be seen, the expansion damping valve 10 is provided with higher stiffness at the portion including and radially inside of the portion mating with the inner seat surface 2m, than at the portion radially outside of the inner seat surface. Furthermore, the expansion damping valve 10 is biased toward the inner and outer valve seat surfaces 2m and 2n by a coil the spring 13, spring force of which is exerted on the expansion damping valve via the valve seat 12.

The fastening nut 14 is formed with a larger diameter section 14a defining therein a bore 14b which has a greater diameter than that of the axial bore 3a of the piston rod 3. The bore 14b is in fluid communication with the axial bore 3a. Opposing the lower open end of the bore 14b, a lower valve body 15 is provided. The lower valve body 15 has an annular groove 15b formed on the lower surface. The lower open end of the annular groove 15b is closed by an expansion check valve 16 which is provided with relatively low stiffness. An annular projection 15e projects from the bottom of the annular groove 15b for supporting the expansion check valve 16. Radial grooves 15f are formed through the annular projection 15e for establishing fluid communication between the inside and outside of the annular projection. The inner portion annular groove 15b oriented radially inside the annular projection 15e is communicated with the bore 14b in the fastening nut 14 via axial openings 15f.

Figure 2:
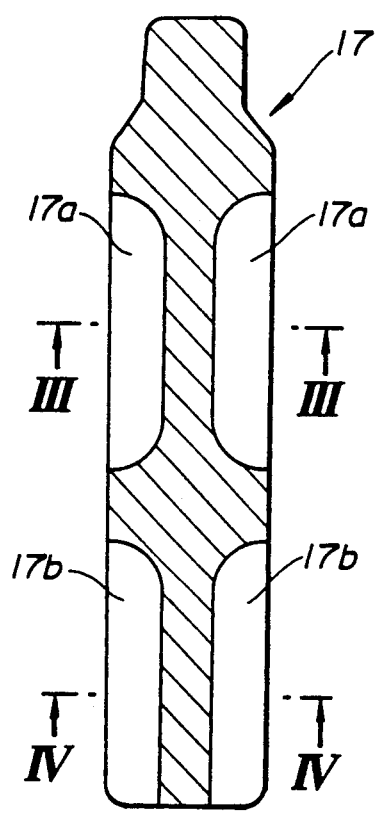
FIG. 2 is a section of a rotary valve member employed in the preferred embodiment of the variable damping force shock absorber of FIG. 1.
Figure 3:
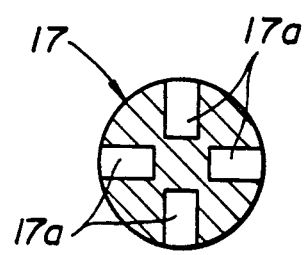
FIG. 3 is a section taken along line m—m of FIG. 2.
Figure 4:
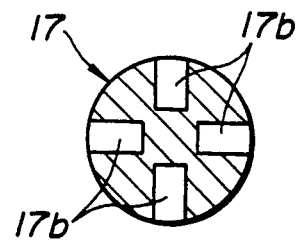
FIG. 4 is a section taken along line IV—IV of FIG. 2.

A rotary valve body 17 is disposed within the axial bore 3a of the piston rod 3 in rotatable fashion. The rotary valve body 17 is disposed and supported between upper and lower bushings 18 and 19. As can be seen from FIG. 1, the lower bushing 19 is formed with an axially extending groove 19a. The rotary valve body 17 is formed with upper and lower axially extending grooves 17a and 17b, as shown in FIGS. 2, 3 and 4. In the shown embodiment, four respective upper and lower grooves 17a and 17b are formed with regular circumferential intervals. The upper axial grooves 17a establishes fluid communication between the radial ports 3c and 3d so as to establish fluid communication between the annular groove 8a of the upper valve body 8 and the inner annular groove 2b of the piston body 2A. On the other hand, the lower axial grooves 17b establish fluid communication between the inner annular groove 2j of the piston body 2 and the bore 14b of the fastening nut 14.

The rotary valve body 17 is connected to an actuation rod 20 which is connected to a driving means, such as a stepping motor or so forth, so that it can be rotatingly driven by the driving torque transmitted therethrough. Therefore, the angular position of the rotary valve body 17 is adjustable for varying fluid flow restriction magnitude for the fluid communication through the upper and lower axial grooves 17a and 17b. Namely, in the shown embodiment, the rotary valve body 17 is variable of the angular position at least between a position at which minimum fluid flow restriction is provided and thus maximum flow rate of working fluid is permitted to flow through the axial grooves 17a and 17b, which position will be hereafter referred to as "SOFT mode position", and a position at which the maximum fluid flow restriction is provided to permit minimum flow rate of working fluid to flow through the axial grooves, which position will be hereafter referred to as "HARD mode position".

Though the shown embodiment is directed to a two way adjustment of damping characteristics by switching the rotary valve body position between the aforementioned SOFT mode position and HARD mode position, it may be possible to provide any number of intermediate damping characteristics modes between SOFT and HARD modes by adjusting fluid flow restriction magnitude at various angular positions of the rotary valve body.

In the construction set forth above, the operation of the shown embodiment of the variable damping force shock absorber, according to the present invention, will be discussed herebelow in order to facilitate better understanding of the invention.

Assuming that the piston strokes in the expanding direction in rebounding motion between the vehicular body and the road wheel, the upper fluid chamber A is compressed to increase the fluid pressure and the lower fluid chamber B is expanded to reduce the fluid pressure. Therefore, fluid flow from the upper fluid chamber A to the lower fluid chamber B is generated. The pressurized fluid flows into the inner annular groove 2j via a communication path 2p defined through the piston body 2. The working fluid in the inner annular chamber 2j acts on the expansion damping valve 10 until the fluid pressure in the inner annular chamber 2j overcomes the spring force of the expansion damping valve 10. Full amount of working fluid flows into the axial bore 3a via the radial ports 3e when the rotary valve body 17 is maintained at the SOFT mode position. Then, the working fluid flows into the lower axial groove 17b of the rotary valve body 17, and through the axial groove 19a of the lower bushing, the bore 14b of the fastening nut 14 and the axial opening 15f into the annular groove 15b. The fluid pressure in the annular groove 15b acts on the expansion check valve 16 for causing deformation of the latter to define a fluid flow path to permit the working fluid to flow into the lower fluid chamber B. This forms the fluid flow route u in FIG. 1.

When the piston stroke speed is increased and thus the fluid pressure in the inner annular groove 2j becomes greater than the resilient force of the expansion damping valve 10, deformation is caused in the expansion damping valve for forming a fluid flow path between the inner valve seat surface 2m and the mating surface of the expansion damping valve for establishing fluid communication between the inner and outer annular grooves 2j and 2k. By deformation of the expansion damping valve, the outer circumference of the expansion damping valve is released from the outer valve seat surface 2n. Therefore, part of the working fluid flowing into the inner annular groove 2j from the upper fluid chamber A flows into the lower fluid chamber B via the fluid flow path thus formed.

Figure 5:
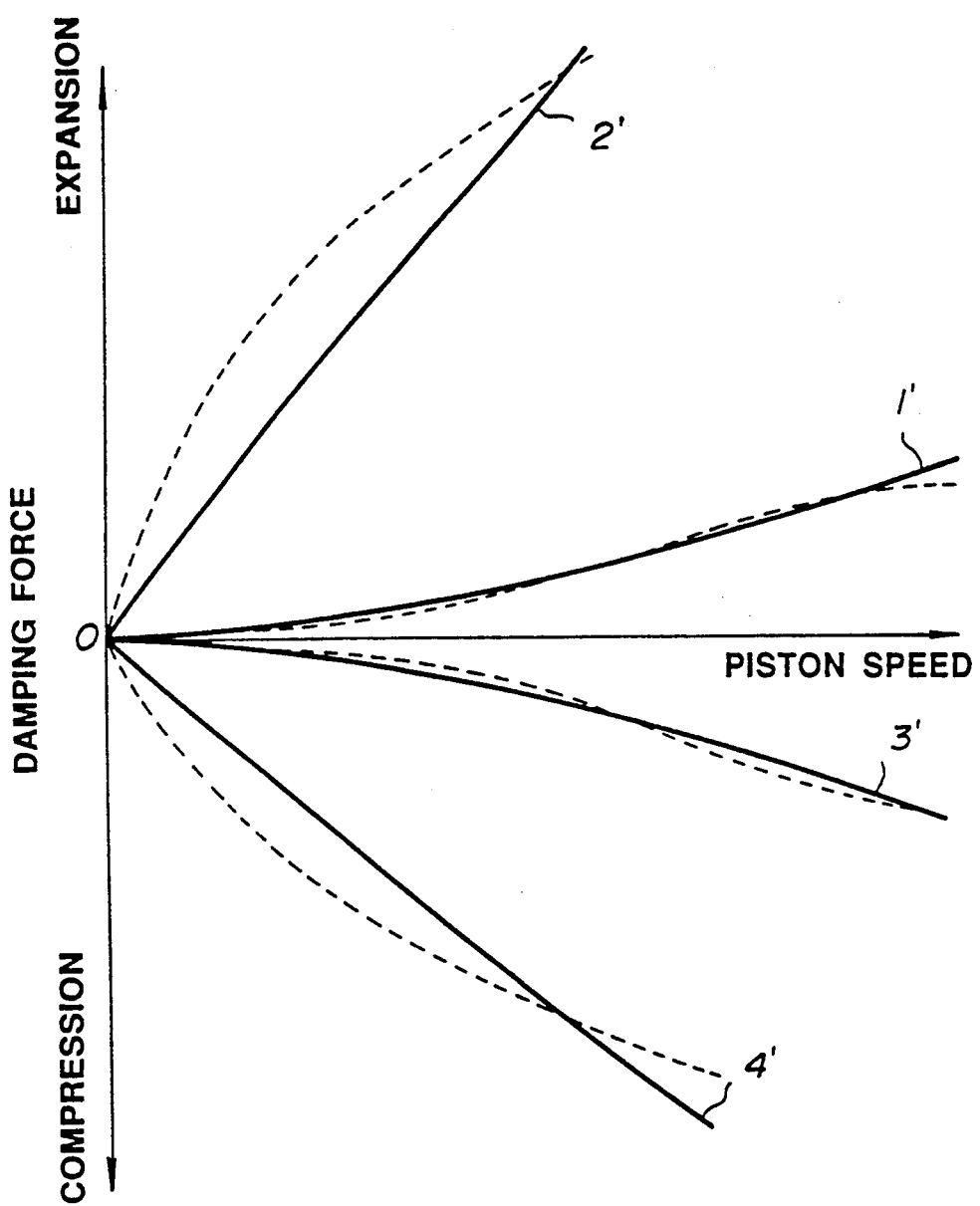
FIG. 5 is a chart showing variation of damping force in each of HARD and SOFT modes of the preferred embodiment of the variable damping force shock absorber.

Assuming that the rotary valve body 17 fully blocks fluid flow through the upper and lower axial grooves 17a and 17b, variation of the damping force generated at the clearance between the inner and outer valve seat surfaces 2m and 2n and the associated portions of the expansion damping valve 10 becomes proportional to the $\frac{3}{2}$ power of the piston stroke speed. Since the clearances between the inner valve seat surface and the associated portion of the expansion damping valve and between the outer valve seat surface of the circumferential edge portion of the expansion damping valve are provided in tandem fashion or in series, the variation characteristics of the damping force become as illustrated by the solid line 21 of FIG. 5. As can be appreciated from the line 21 of FIG. 5, substantially linear and HARD damping characteristics can be provided.

On the other hand, when the rotary valve body 17 is in the SOFT mode position for providing maximum fluid flow path, the full amount of working fluid flows through the aforementioned route II when the piston stroke speed is relatively low. At this time, the SOFT mode damping characteristics are proportional to the square of the piston stroke speed in the low piston stroke speed range, as shown by solid line 11 of FIG. 5. On the other hand, when the piston speed is increased to increase fluid pressure in the inner annular chamber 2j to overcome the resilient force of the expansion damping valve 10, the clearances between the inner valve seat surface and the associated portion of the expansion damping valve and between the outer valve seat surface of the circumferential edge portion of the expansion damping valve are formed for permitting the fluid flow therethrough. As a result, part of the working fluid flows through these clearance to generate damping force proportional to the ⅔ power of the piston stroke speed. As a result, in the SOFT mode position of the rotary valve body 17, substantially linear damping force variation characteristics can be obtained at relatively high piston stroke speed range by maintaining the damping force generated substantially small at any piston stroke speed in comparison with that in the HARD mode.

On the other hand, in the piston compression stroke in response to bounding motion between the vehicular body and the road wheel, the fluid pressure in the lower fluid chamber B is increased according to the piston compression stroke. Therefore, fluid flow from the lower fluid chamber B to the upper fluid chamber A is generated. The working fluid in the lower fluid chamber B thus flows into the inner annular chamber 2b of the piston body 2A. The working fluid in the inner annular groove 2b flows into the upper axial groove 17a of the rotary valve body 17 via the radial ports 3d and then flows into the annular groove 8a via the radial port 3c. Therefore, the fluid flow route III is established as shown in FIG. 1. As long as the fluid pressure in the inner annular groove 2b is lower than the set force of the compression damping valve 9, the working fluid flows from the lower fluid chamber B to the upper fluid chamber A only through the aforementioned fluid flow route III. The working fluid thus flows into the annular groove 8a to cause deformation of the compression check valve 7 to flow into the upper fluid chamber A.

On the other hand, when the fluid pressure in the inner annular groove 2b overcomes the set force of the compression damping valve 9, the compression damping valve 9 is deformed to be released from respective of the inner and outer valve seat surfaces 2d and 2e for forming a fluid flow gap therebetween. Therefore, part of the working fluid in the inner annular groove 2b flows into the upper fluid chamber A via the fluid flow gap thus formed.

Similarly to the piston expansion stroke, respective of the variation, the characteristics of the damping force generated by flow restriction in the fluid flow gaps defined between the inner valve seat surface 2m and the associated portion of the compression damping valve 9, and the outer valve seat surface 2n and the outer circumferential edge portion of the compression damping valve are proportional to the ⅔ power of the piston stroke speed. By arranging the fluid flow gaps in tandem fashion, relatively high variation rate and substantially linear variation characteristics of the damping force can be obtained as illustrated by the solid line 41. On the other hand, assuming that the rotary valve body 17 is placed at the SOFT mode position to provide the minimum flow restriction magnitude, the variation of damping force at relatively low piston stroke speed becomes proportional to the square of the piston stroke speed with relatively low variation rate, as illustrated by solid line 31. When the piston speed is increased to induce the fluid pressure in the inner angular chamber to be greater than the set force of the compression damping valve 9, then damping characteristics proportional to the ⅔ power of the piston stroke speed are generated by the compression damping valve 9. Therefore, the overall damping characteristics at relatively high piston speed range becomes substantially linear.

As can be appreciated herefrom, according to the present invention, wide range adjustment of the damping characteristics can be achieved without causing degradation of linearity of damping force variation relative to the piston stroke speed.

While the present invention has been discussed in terms of the preferred embodiment of the invention, the invention can be implemented in various fashions. Therefore, the invention should not be understood to be specific to the shown embodiment but to include all possible embodiments and modifications which can be embodied without departing from the principle of the invention as set out in the appended claims.

What is claimed is:

1. A variable damping force shock absorber comprising:

a cylinder having an interior space containing working fluid;

a piston assembly disposed within said interior space of said cylinder and dividing said interior space into a first fluid chamber and a second fluid chamber which are filled with said working fluid;

a piston rod extending into said interior space and having a bore and a radial port communicating with said bore of said piston rod;

said piston rod having a first bushing and a second bushing within said bore thereof, said second bushing being spaced from said first bushing and disposed adjacent a hollow fastening, said first bushing closing one end of said bore of said piston rod and being formed with a groove having one end communicating said bore of said piston rod and an opposite end;

a rotary valve member rotatably disposed in said bore of said piston rod and supported between said first and second bushings, said rotary valve member having a first angular position in which said rotary valve member covers said radial port to block fluid communication between said radial port and said one end of said groove of said second bushing and a second angular position in which said rotary valve member uncovers said radial port to allow fluid communication between said radial port and said one end of said groove of said second bushing;

a hollow fastening nut fixedly coupled with said piston rod and having formed therein a bore having one end communicating with said opposite end of said groove of said second bushing;

a valve body fixedly secured to said hollow fastening nut to close an opposite end of said bore of said hollow fastening nut, said valve body being formed with an opening communicating with said bore of said hollow fastening nut;

a check valve mounted to said valve body and covering said opening to prevent a flow of fluid from said second fluid chamber to said bore of said hollow fastening nut through said opening;

said piston assembly being assembled on said piston rod and fixed thereto, said piston assembly including a piston body having a first end surface adjacent to said first fluid chamber and a second end surface adjacent to said second fluid chamber, said piston body having a fluid path formed therein, said fluid path having one end communicating with said first fluid chamber and an opposite end, said piston body having a central groove communicating with said radial port of said piston rod;

said piston body having said second end surface formed with an inner groove communicating with said opposite end of said fluid path, an outer groove disposed radially outward of said inner groove, and a radial groove communicating with said inner groove and said central groove; and a damping valve mounted to said piston body and disposed on said second end surface for covering said inner, outer and radial grooves and said central groove.

2. A variable damping force shock absorber as claimed in claim 1, wherein said rotary valve member is formed with groove means for establishing fluid communication between said radial port and said one end of said groove of said second bushing when said rotary valve member assumes said second angular position.

* * * * *